United States Patent [19]

Vomhoff

[11] Patent Number: 4,607,420
[45] Date of Patent: Aug. 26, 1986

[54] ROLLER FOR A MACHINE FOR MANUFACTURING ENDLESS TAPE MATERIAL

[75] Inventor: Erich Vomhoff, Königsbronn, Fed. Rep. of Germany

[73] Assignee: Schwäbische Hüttenwerke GmbH, Aalen-Wasseralfingen, Fed. Rep. of Germany

[21] Appl. No.: 577,123

[22] Filed: Feb. 6, 1984

[30] Foreign Application Priority Data

Feb. 7, 1983 [DE] Fed. Rep. of Germany ....... 3304076

[51] Int. Cl.⁴ .......................... B21B 31/32; B60B 9/00
[52] U.S. Cl. ............................... 29/113 R; 100/162 B; 29/125
[58] Field of Search ...... 29/116 AD, 116 R, 113 AD, 29/113 R, 110, 151.3 R, 125; 100/162 B

[56] References Cited

U.S. PATENT DOCUMENTS

| 1,232,053 | 7/1917 | Lawrence | 29/125 |
| 1,563,216 | 11/1925 | Moog | 241/292 |
| 2,660,429 | 11/1953 | Lorig | 29/125 X |
| 3,231,934 | 1/1966 | Diotti | 29/125 X |
| 3,950,897 | 4/1976 | Birkenstack et al. | 241/292 X |
| 4,086,957 | 5/1978 | Schrewe et al. | 29/110 |

FOREIGN PATENT DOCUMENTS 1131552  2/1957  France ................... 29/125

Primary Examiner—Howard N. Goldberg
Assistant Examiner—Timothy V. Eley
Attorney, Agent, or Firm—Michael J. Striker

[57] ABSTRACT

In an elongated heatable roller for a machine for manufacturing tape-like material, such as a paper machine, and comprising an outer sleeve and a displacement cylindrical member disposed in the outer sleeve so that a clearance for passing a heat-conducting fluid is formed between the outer sleeve and the displacement member. Imbalance-compensating masses are provided for compensating for imbalance occurring on the roller and causing deflections of the roller. The imbalance-compensating masses are attached to the inner surface of the displacement member and preferably midway between the ends thereof.

11 Claims, 3 Drawing Figures

ROLLER FOR A MACHINE FOR MANUFACTURING ENDLESS TAPE MATERIAL

BACKGROUND OF THE INVENTION

The present invention relates to a roller of a relatively large size for a machine for manufacturing endless tape material, for example a paper machine or foil-pulling calender or mangle.

Rollers of the type under discussion are elongated rollers, which are comprised of a roller outer sleeve in which a push-away or displacement member is rigidly centrally positioned so that a cylindrical clearance is formed between the inner surface of the outer sleeve and the external surface of the displacement member. That clearance serves for passing therethrough a heat-conducting fluid to heat the roller. The roller is also provided with two trunnions laterally positioned on the sleeve and connected thereto. The trunnions are formed with a fluid-feeding passage and a fluid-discharging passage, respectively to admit and discharge heat-conducting fluid into and from the aforementioned clearance.

Rollers for machines for fabricating endless tape material usually have the length of 3 to 12 m and outer diameter of 30 to 120 cm. Since such rollers, in spite of required slenderness ratio, must be very rigid the wall of the outer sleeve should be sufficiently thick. Therefore the outer sleeves of such rollers are normally formed by mold-casting. Preferably the outer sleeve of the roller is made of a chilled cast iron-molded cylinder or a cast iron-molded cylinder which has at the inner area a gray cast iron structure and at the outer area the structure of white cast iron. Because of the size of the cylinder this cylinder of chilled cast iron is molded by bottom-casting with a tangentially flowing melt so that the structure of the cylinder is substantially rotation-symmetrical. The cylinder is then machined and drilled through.

Depending on the use, in operation of such a roller the latter is subjected either to low temperatures or cooled off or to high temperatures or thus heated. Operation temperatures of the roller are rather steady.

The rollers of the foregoing type are, however, not free of being unbalanced for many reasons. Concentricity of the limiting surfaces of the gray cast iron and white case iron is not achieved in practice.

As far as the rollers are not too long and do not rotate with high peripheral speed and act during the operation as approximately rigid rollers, these rollers are balanced-out according to the principle of dynamic counterbalance in two planes by means of compensating bores formed in lateral faces of the roller sleeve at respective places, and also in the heavy region of the roller.

However, such an imbalance-compensation is not sufficient when the roller exceeds a predetermined ratio of slenderness or a predetermined number of revolutions or both these criteria. With increased ratio of slenderness and increased number of revolutions a problem occurs as to where on the relatively long roller could be imbalance found. The roller under such conditions is no longer rigid during operation. If imbalance is found on one or two ends of the roller the above described balancing-out or compensation is sufficient. However, if imbalance is found at the substantial distance from the roller ends such a compensation is no longer sufficient. The roller than has a tendency to be bent or deflected in operation under the influence of centrifugal forces so that imbalance with the increased number of revolutions would be further increased. To counteract or inhibit that tendency the roller outer sleeve is precisely ground over and rotated with operation number of revolutions. During the rotation with operation number of revolutions a middle value of deflection or bending of the roller and also a value of deflection due to dynamic centrifugal forces are measured before the imbalance of the roller body is compensated for by means of bores formed at the ends of the roller body. This deflection of the roller body at the state of operation is compensated because the roller body is again polished or ground. The axis of rotation of the roller is so selected that no middle deflection occurs in the middle region of the roller body. This balancing-out centering process is completed with a commonly known procedure of balancing via dynamic counterbalance in two planes at the ends of the roller body. The centering step contributes to the deformations of the roller during the heating thereof and also to the bimetal effect.

The counterbalancing of the roller obtained by bores formed in the roller can be, however, easily lost. Even a minimal displacement of the center of the bore can cause a new imbalance which would lead to a new deflection of the roller having a great ratio of slenderness.

SUMMARY OF THE INVENTION

It is an object of the present invention to provide an improved elongated heatable roller for tape material-manufacturing machines.

It is a further object of this invention to provide for a reliably balanced-out heatable roller for a paper machine or the like.

These and other objects of the invention are attained by an elongated heatable roller for a machine for manufacturing endless tape material, such as paper machine, foil-pulling calender or the like, comprising an outer cylindrical sleeve having a finished outer surface and a finished inner surface; a displacement member centrally positioned in said sleeve so that a clearance is formed therebetween for passing through said clearance a heat-conducting fluid; two trunnions rigidly connected to said sleeve and each having a through passage communicating with said clearance, the through passage of one of said trunnions being an inlet passage for the heat-conducting fluid and the through passage of another of said trunnions being an outlet passage for the heat-conducting fluid, said sleeve having two ends; and imbalance-compensating means for compensating for imbalance occurring on said sleeve at a distance from said ends and for various heat expansions of said sleeve, causing deflections of said sleeve, said imbalance-compensating means being applied to said displacement member.

The structure of the slender roller for a tape-like material-manufacturing machine permits one to avoid middle deflections of the outer sleeve of the roller by simple means. Moreover, due to the invention even deflections caused by thermal expansions can be also avoided.

The present invention also allows for compensating for imbalance occurring in a manufactured or finished outer sleeve of the roller. For this purpose the roller sleeve which has been dynamically balanced-out and drilled through is subjected to rotation with the number of revolutions corresponding to that required during the operation of the roller and it is determined whether and where on the sleeve a bending occurs under operational conditions or whether an occuring bending is shifted towards the ends of the roller. A measurement of the deflection or bending and balancing-out of the roller are normally sufficient in the middle of the elongated roller. If the direction of the deflection as well as the place of the greatest deflection on the roller sleeve which is normally in the middle of the length of the roller, are determined then required imbalance-compensating masses are easily calculated and applied to that place of the displacement member which is opposite to the "roller hump" so as to compensate for deflection due to imbalance of the roller.

The imbalance-compensating means may be compensating masses attached to said displacement member.

Furthermore, the imbalance compensating means may be compensating recesses formed in said displacement member.

It is to be understood that before imbalance-compensating masses are attached to the displacement member or before imbalance-compensating recesses are provided in the displacement member the latter must be balanced-out itself. This presents no technical problems because the displacement member is normally made out of a light machined steel tube whereas the compensation for a mass-imbalance of the roller sleeve is theoretically possible but very expensive.

Although the provision of the imbalance-compensating recesses in the displacement member is as effective as the utilization of imbalance-compensating masses the latter alternative has proved to be preferable.

According to a further feature of the invention the displacement member may be cylindrical and have an inner surface, and the compensating masses may be attached to the inner surface of the displacement member, for example by welding.

The displacement member may be a one-piece cylindrical element or may be formed of two cylindrical halves joined to each other, said halves having extension portions at a joint thereof, the compensating masses being positioned at said extension portions.

The displacement member may have radial openings which open into said clearance for communicating said clearance with the inlet passage and the outlet passage, respectively.

In one of the simplest modifications, if the displacement member is a one-piece cylindrical element, openings may be provided in the wall of the displacement member and bolts of corresponding dimensions may be screwed into those openings in a fluid-tight fashion, as imbalance-compensating masses.

With two-part or multi-part displacement members it is recommended to attach the imbalance-compensating masses at the joint point between the parts of the displacement member, and better at the inner surface of the displacement member. It is also recommendable to place the imbalance-compensating masses in the roller so that they would not prevent an unobstructed heat-conducting fluid flow in the clearance between the outer sleeve and the displacement member of the roller.

According to still another feature of the invention supporting element may be provided between the outer sleeve and displacement member for supporting said displacement member against said sleeve, said supporting elements being positioned in the region of the imbalance-compensating masses so that the action of the imbalance-compensating masses would not contribute to deformations of the bending-resistant displacement member.

According to yet another feature of the invention the balance-compensating masses may be individual containers filled with heat-conducting fluid.

The roller may further include conduit means arranged between the inlet passage and the containers for delivering heat-conducting fluid to said containers.

The conduit means may include a plurality of individual tubes interconnected between the inlet passage and the individual containers.

The individual containers filled with fluid and operating as imbalance-compensating masses may be uniformly circumferentially distributed on the inner surface of the displacement member. Such an arrangement of the imbalance-compensating containers is sufficient for balancing-out the roller in all the instances because as a rule it is sufficient to provide for imbalance-compensation in the middle of the roller, or at the distance from the ends of the roller body. If a required number of the fluid-filled containers are provided in the middle of the roller's length the imbalance-compensation in the middle of the roller is carried out. With relatively long rollers a number of containers filled with fluid can be distributed over the length of the roller instead of the containers circumferentially distributed at the inner surface of the displacement member at one middle point of the roller. The possible deformations of the roller body in operation should be also taken into consideration while the position of the imbalance-compensating masses in the roller is determined.

If the roller of a tape material-manufacturing machine has no displacement member an additional support must be inserted in the cylindrical hollow roller, which support would ensure that the displacement element arrangement moves either in the circumferential or longitudinal direction of the roller. In other words, a proper substitution for the displacement member must be provided in the heatable roller. An expanding ring may be utilized as a support.

It is essential for the elongated heatable roller according to the invention that the displacement member be centered and fixed in a circumferential direction and in a radial direction within the interior of the outer sleeve of the roller. This presents no technical problems because it has been a known practice to fix the displacement member. A fixing in the radial direction is performed by means of the aforementioned supporting elements mounted in the clearance between the outer sleeve and the displacement member. A fixing of the displacement member in the circumferential direction is usually carried out by means of springs arranged and acting against one or both trunnions positioned at two ends of the outer sleeve. A fixing of the displacement member in the axial direction is not required because a usual axial play of the displacement member is not important for the present invention.

For an imbalance-compensation of the roller having a number of displacement members lugs can be provided, which may be formed at the ends of the displacement members and extend inwardly. Bones may be made in those lugs for imbalance-compensation. Furthermore, interrupted lugs may be provided in the roller construction. Then additional imbalance compensating masses may be applied, for example by welding, to those lugs. In the case of a one-piece displacement member a ring may be mounted centrally of this member, which ring may be formed with pocket bores. Thus, the present invention offers many various possibilities and modifications for arrangements of the imbalance-compensating on the displacement or push-away member positioned within the hollow outer sleeve of the heatable elongated roller.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
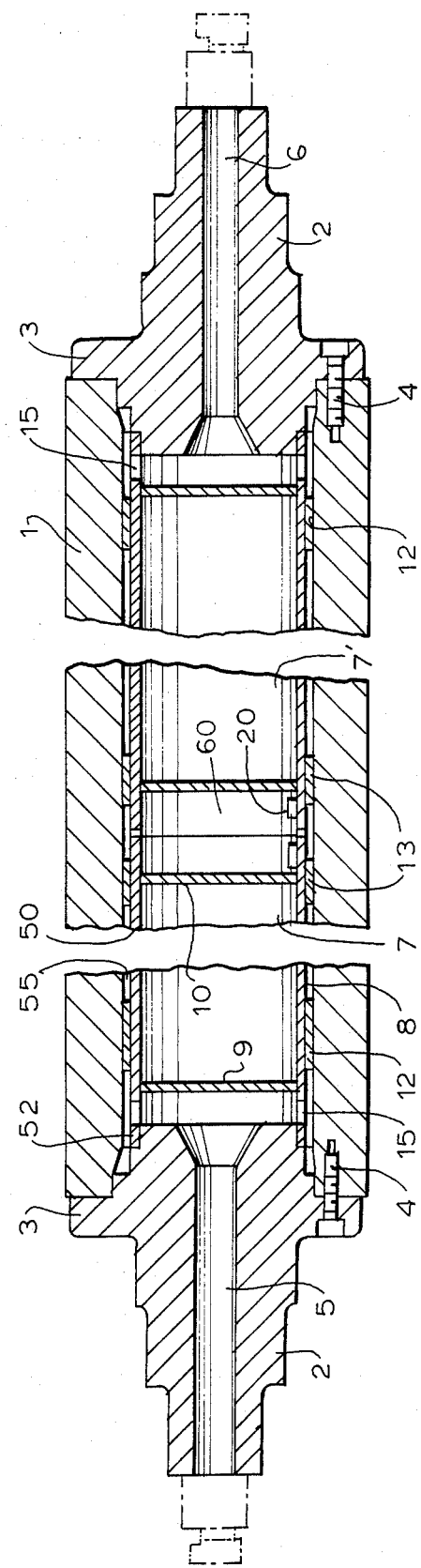
FIG. 1 is an axial sectional view of a balanced-out heatable iron roller for a paper machine according to a first embodiment of the invention.

Referring now to the drawings in detail and firstly to FIG. 1 thereof, it will be seen that a heatable roller for a paper machine includes a cylindrical sleeve 1 of cast iron and two identical bearing trunnions 2 which are formed integrally with respective lateral flanges 3 at which the trunnions abut against the respective lateral faces of sleeve 1.

The roller sleeve 1 is bottom-cast in a vertical cast with a tangential mold. After the molding of the sleeve central bores are drilled therein from two lateral faces thereof towards each other. The sleeve 1 made out of cast iron is comprised at the most of the radial extension thereof of gray cast iron which only at the outer edge area changes over into white cast iron.

Trunnions 2, which are also cast-molded, are then finished in the usual fashion and bolted to the lateral faces of roller sleeve 1 by means of bolts 4.

An inlet passage 5 and an outlet passage 6 for a heat-conducting liquid extend, respectively, trough the trunnions 2 which lead to and from the interior of the roller. It is, of course, understood that inlet and outlet passages in two trunnions 2 can be interchanged. The interior hollow space of the roller is filled with a two-part push-away or displacement member 50 formed of two even halves 7 and 7' which are in the middle pushed towards each other. Each half of the displacement member 50 includes a cylindrical portion 8 of sheet metal which is closed at two ends thereof with end plates 9 and 10 extended transversally to the elongation of the cylindrical portion and tightly welded thereto at the inner surface of that portion. Each half 7 and 7' of the displacement member 50 also has fins 12 welded to the outer surface of each cylindrical portion 8 and extended in the direction of elongation of the roller. These fins 12 are uniformly distributed on the outer surface of each cylindrical portion 8 and are supported against the inner surface of the roller sleeve 1. In addition fins 13, also uniformly distributed on the outer surface of each cylindrical portion 8, to which they are welded, are provided on the displacement member in the middle area thereof. Fins 13 are applied to each cylindrical portion in the region of transversal end plate 10 so that these fins overlap the end plate or extend longitudinally beyond end plate 10. Fins 13 are also supported against the inner surface of sleeve 1 and are provided in this region to enable the application in this region of compensation masses as will be described herein below.

An extension 52 of each cylindrical portion 8, which extends outwardly beyond the end plate 9, is formed with a plurality of radially projected bores 15, through which heat-conducting fluid is fed from the inlet passage 5 into a clearance 55 between the displacement member 50 and sleeve 1. Likewise heat-conducting fluid passes through radial bores 15 from clearance 55 into outlet passage 6 at another end of the roller.

For manufacturing just a rough construction of the above-described roller the latter is centered after the outer grinding of the roller body. Bores are then drilled in the roller body so produce a roller sleeve. The manufactured roller sleeve is then rotated with an operation number of revolutions. Each roller body can be supported, for example on four rolls spaced from each other. Now by means of a suitable measuring device, one should determine a middle working range of the manufactured roller sleeve. Further one should determine the place on the outer periphery of the sleeve at which the greatest deflection or bending of the sleeve could occur. Then it is necessary to calculate as to how large a compensation mass should be to be sufficient to compensate for that deflection when that compensation mass would be applied to the middle of the roller sleeve. Naturally, it should be taken into consideration that the center of gravity of the compensation mass should be located on the radius which is insignificantly smaller than the inner radius of each cylindrical portion 8 made out of sheet metal, because the compensation masses, in the exemplified embodiment, should be welded to the portions 8 of displacement member 50 in the proximity of the ends of those portions.

The size of the compensation mass is precisely calculated because the position of the center of gravity of this mass has been considered. The necessary calculations are elementary and easy to anyone skilled in the art. With reference to FIG. 1 it is seen that two compensating or balancing-out masses 20, formed of steel, are welded to the inner surfaces of two cylindrical portions 8 in the proximity of the inner ends of both halves 7 and 7'. In order to support compensating masses 20 external portions 60 extend beyond the end plates 10 at the inner ends of halves 7, 7', these external portions 60 should project beyond end plates a sufficient distance in the longitudinal direction. Both halves 7, 7' of the displacement member 50 together with compensating masses 20 welded thereto at the place of the possible greatest deflection determined during a test run and under corresponding temperature fluctuations are then inserted into the roller sleeve 1 in a correct pivot position and slip-jointed therein. Then, after connecting flanges 3 of trunnions 2 to the roller sleeve 1, the roller is assembled.

It has been found expedient in practice that before a final determination of the place of the greatest deflection of the roller the roller sleeve 1 has been dynamically balanced in three planes and a determined imbalance of the sleeve has been compensated for by axial bores drilled in the sleeve from the lateral faces thereof.

Figure 3:
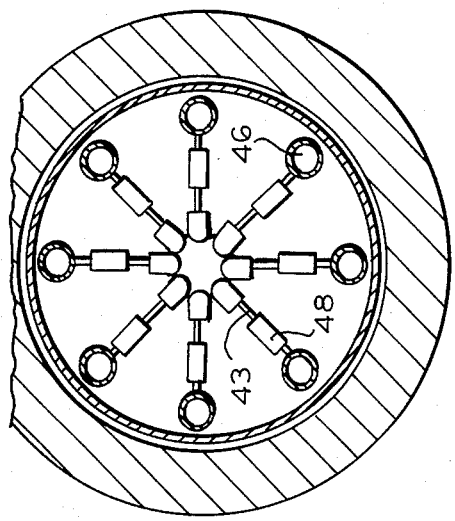
FIG. 3 is a sectional view taken along line III—III of FIG. 2.
Figure 2:
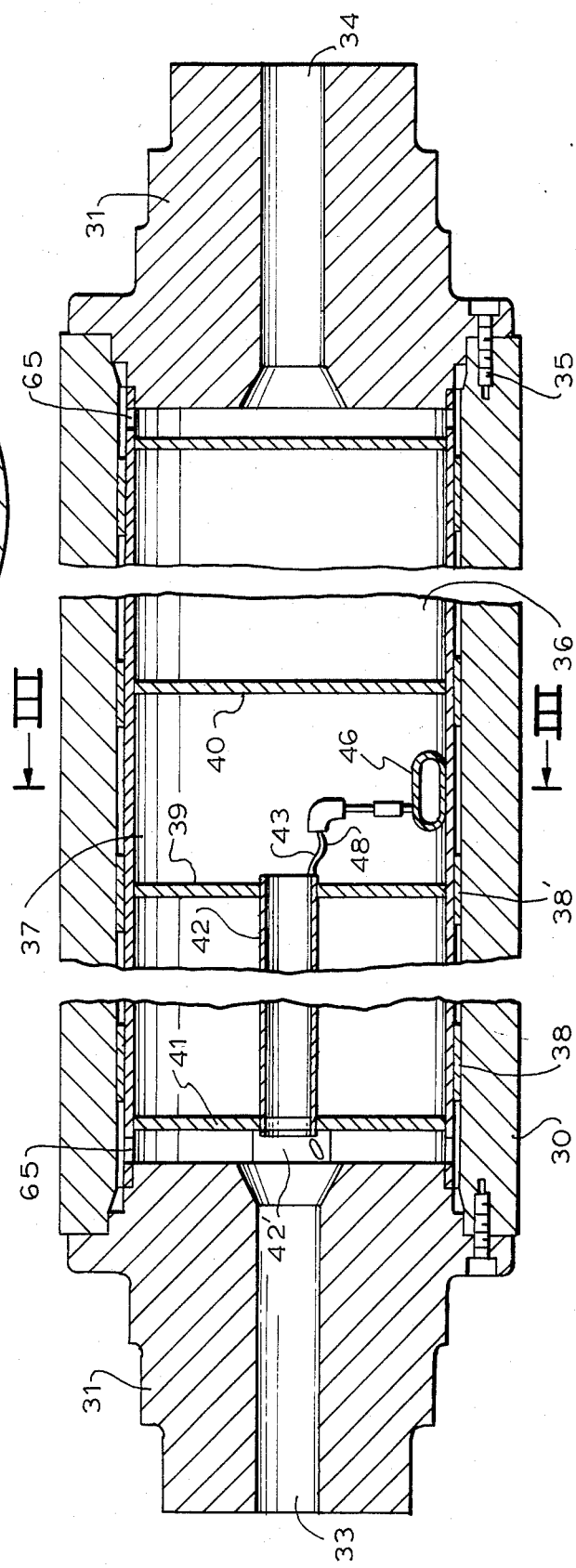
FIG. 2 is an axial sectional view of the roller, according to a second embodiment of the invention.

In the embodiment shown in FIGS. 2 and 3, the heatable roller of the paper machine is comprised of a sleeve 30 made of cast iron and two trunnions 31 which are at the flanges thereof connected to the end faces of sleeve 30 by bolts 35. An inlet passage 33 and an outlet passage 34 are formed in trunnions 31, respectively, for passing therethrough heat-conducting fluid. Before the assembling of the roller sleeve 30 the latter is dynamically balanced-out, centered and provided with axial bores.

A displacement member 36 of cylindrical shape is mounted in the interior of sleeve 30 so that a cylindrical clearance 37 is formed between the inner surface of sleeve 30 and outer periphery of displacement member 36 to pass heat-conducting fluid from inlet passage 33 and radial bores 65 to outlet passage 34. Displacement member 36 is supported against the inner surface of the roller sleeve by means of axially extended supporting elements 38 similarly to the embodiment of FIG. 1. One-piece cylindrical displacement member 36 is utilized in this embodiment. Displacement member 36 is relatively long and has two inner transversal walls or plates 39 and 40 and two outer transversal plates 41 which are welded at the periphery thereof to the inner surface of the cylindrical portion of member 36. Transversal plates 41 and 39 carry a centrally projected tubular feeding element 42 through which eight relatively thin feeding tubes 43 extend. Tubes 43 are uniformly distributed over the periphery of central feeding element 42. Only one feeding tube 43 is shown in FIG. 2 for the sake of clarity.

Tubular feeding element 42 extends from a head 42' into which each tube 43 opens. Head 42' has eight feed-in valves not shown herein and corresponding to eight tubes 43. The feed-in valves are of a suitable known construction. Each tube 43 is connected to a fluid-containing container 46. Eight containers 46, which are compensating or balancing-out masses in this embodiment of the roller, are uniformly distributed over the inner surface of displacement member 36 as shown in FIG. 3. The roller provided with containers 46 is ready to be assembled.

In this ready-to-be-assembled condition, in which the roller runs on its trunnions 31, a middle value of an axial deflection or bending of the roller according to an operation number of revolutions is determined. Then required compensating masses to be inserted in the middle of the roller sleeve are calculated. Thereafter, those containers 46, which have been defined in accordance with the calculated value of compensating masses, are filled with fluid under sufficiently high pressure by means of respective intake nozzles. Each container 46 has at the inlet thereof a check valve 48. The left-hand trunnion 31 is disconnected from sleeve 36 before containers 46 are filled with fluid.

It is understood that before insertion of displacement member 36 into sleeve 30 the displacement member must be preliminarily balanced out in order not to unfavorably affect the running properties of the roller.

In place of compensating masses 20 in FIG. 1 or containers 46, filled with heat-conducting fluid from passage 33 and tubes 43, recesses can be formed in the cylindrical wall which forms the displacement member 50 or 36, these recesses being formed in that wall opposite to supporting members 13 in FIG. 1 or 38' in FIG. 2.

It will be understood that each of the elements described above, or two or more together, may also find a useful application in other types of rollers for machines for manufacturing endless tape material differing from the types described above.

While the invention has been illustrated and described as embodied in a roller for a machine for manufacturing endless tape material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An elongated heatable roller for a machine for manufacturing endless tape material, such as paper machine, foil-pulling calender or the like, comprising an outer cylindrical sleeve having a finished outer surface and a finished inner surface; an inner cylindrical displacement member having an inner surface and an outer surface and being centrally positioned in said sleeve so that a clearance is formed between said outer sleeve and the outer surface of said displacement member for passing through said clearance a heat-conducting fluid; two trunnions rigidly connected to said sleeve and each having a through passage communicating with said clearance, the through passage of one of said trunnions being an inlet passage for the heat-conducting fluid and the through passage of another of said trunnions being an outlet passage for the heat-conducting fluid, said sleeve having two ends at which the sleeve is dynamically balanced; and additional imbalance-compensating masses for compensating for imbalanace occurring on said sleeve at a distance from said ends and for various heat expansions of said sleeve, causing deflection of said sleeve, said imbalance-compensating means being rigidly attached to the inner surface of said displacement member in the middle area thereof.

2. An elongated heatable roller for a machine for manufacturing endless tape material, such as paper machine, foil-pulling calender or the like, comprising an outer cylindrical sleeve having a finished outer surface and a finished inner surface; an inner cylindrical displacement member having an inner surface and an outer surface and being centrally positioned in said sleeve so that a clearance is formed between said outer sleeve and the outer surface of said displacement member for passing through said clearance a heat-conducting fluid; two trunnions rigidly connected to said sleeve and each having a through passage communicating with said clearance, the through passage of one of said trunnions being an inlet passage for the heat-conducting fluid and the through passage of another of said trunnions being an outlet passage for the heat-conducting fluid, said sleeve having two ends; and imbalance-compensating means for compensating for imbalance occurring on said sleeve at a distance from said ends and for various heat expansions of said sleeve, causing deflections of said sleeve, said imbalance-compensating means being rigidly attached to the inner surface of said displacement member and including a plurality of individual containers each filled with heat-conducting fluid, and conduit means including a plurality of individual tubes interconnected between said inlet passage and said individual containers for feeding heat-conducting fluid to said containers.

3. The roller as defined in claim 1, wherein said compensating masses are welded to said inner surface.

4. The roller as defined in claim 1, wherein said compensating masses are individual containers filled with heat-conducting fluid.

5. The roller as defined in claim 4, further including conduit means arranged between said inlet passage and said containers for feeding heat-conducting fluid to said containers.

6. The roller as defined in claim 5, wherein said conduit means include a plurality of individual tubes interconnected between said inlet passage and said individual containers.

7. The roller as defined in claim 6, wherein said individual containers are uniformly circumferentially distributed on said inner surface.

8. The roller as defined in claim 1, wherein supporting elements are provided between said sleeve and said displacement member for supporting said displacement member in said sleeve, said supporting elements being positioned in the region of said imbalance-compensating means.

9. The roller as defined in claim 1, wherein said displacement member is formed of two cylindrical halves joined to each other, said halves having extension portions at a joint thereof, said compensating masses being positioned at said extension portions.

10. The roller as defined in claim 1, wherein said displacement member has radial openings which open into said clearance for communicating said clearance with said inlet passage and said outlet passage, respectively.

11. The roller as defined in claim 1, wherein said sleeve is formed of cast iron and said displacement member is formed of a steel tube.

* * * * *